US010915502B2

(12) United States Patent
VanBlon et al.

(10) Patent No.: US 10,915,502 B2
(45) Date of Patent: Feb. 9, 2021

(54) ANONYMOUS DIGITAL FILE SHARING

(71) Applicant: LENOVO (Singapore) PTE. LTD., New Tech Park (SG)

(72) Inventors: Russell Speight VanBlon, Raleigh, NC (US); John Weldon Nicholson, Cary, NC (US); Ming Qian, Cary, NC (US); Song Wang, Cary, NC (US); Scott Wentao Li, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 220 days.

(21) Appl. No.: 15/704,271

(22) Filed: Sep. 14, 2017

(65) Prior Publication Data
US 2019/0079944 A1 Mar. 14, 2019

(51) Int. Cl.
*G06F 16/14* (2019.01)
*G06F 16/11* (2019.01)

(52) U.S. Cl.
CPC .......... *G06F 16/152* (2019.01); *G06F 16/119* (2019.01); *G06F 16/122* (2019.01)

(58) Field of Classification Search
CPC .... G06F 16/152; G06F 16/122; G06F 16/119; G06F 21/6254; H04L 63/0407
See application file for complete search history.

(56) References Cited

U.S. PATENT DOCUMENTS

| 7,536,725 | B2 * | 5/2009 | Raciborski | .......... | H04L 63/0428 |
| | | | | | 707/999.01 |
| 2005/0154608 | A1 * | 7/2005 | Paulson | ................. | G06Q 10/10 |
| | | | | | 705/52 |
| 2006/0251338 | A1 * | 11/2006 | Gokturk | ................ | G06F 16/583 |
| | | | | | 382/305 |
| 2007/0198832 | A1 * | 8/2007 | Novack | ................. | H04L 9/3263 |
| | | | | | 713/158 |
| 2007/0260643 | A1 * | 11/2007 | Borden | ................. | G06F 16/162 |
| 2011/0042470 | A1 * | 2/2011 | Deivasigamani | ... | F24D 19/1051 |
| | | | | | 236/51 |
| 2013/0278422 | A1 * | 10/2013 | Friedman | ......... | G08B 13/19613 |
| | | | | | 340/541 |
| 2013/0318347 | A1 * | 11/2013 | Moffat | .................... | H04L 63/06 |
| | | | | | 713/168 |
| 2015/0046793 | A1 * | 2/2015 | Frenkel | .................. | G06Q 50/01 |
| | | | | | 715/234 |
| 2016/0147836 | A1 * | 5/2016 | Liu | ...................... | G06F 17/2235 |
| | | | | | 707/758 |
| 2016/0196286 | A1 * | 7/2016 | Kim | ..................... | G06F 16/5866 |
| | | | | | 707/741 |

(Continued)

*Primary Examiner* — Usmaan Saeed
*Assistant Examiner* — Jessica N Le
(74) *Attorney, Agent, or Firm* — Kunzler Bean & Adamson

(57) ABSTRACT

Apparatus, methods, and computer program products that can anonymously share digital files are disclosed. Various embodiments of an apparatus include a processor of an information handling device and memory that stores code executable by the processor. The code can cause the processor to match a first client to one or more digital files provided by a second client based on a content signature in each of the one or more digital files and notify the first client of a match. The first client can be anonymous to the second client and/or the second client maybe anonymous to the first client. A method and program product can also perform the functions of the apparatus.

20 Claims, 7 Drawing Sheets

(56) References Cited

U.S. PATENT DOCUMENTS

| | | | | |
|---|---|---|---|---|
| 2016/0323108 A1* | 11/2016 | Bhogal | ................ | H04W 12/08 |
| 2017/0148241 A1* | 5/2017 | Kerning | ................ | H04W 4/14 |
| 2017/0193124 A1* | 7/2017 | Wong, Jr. | ........... | G06K 19/0723 |
| 2017/0206552 A1* | 7/2017 | Rajkumar | .............. | G06Q 30/02 |
| 2017/0359224 A1* | 12/2017 | Auerbach | ............... | H04L 67/06 |
| 2018/0373859 A1* | 12/2018 | Ganong | ................ | G06F 21/32 |

* cited by examiner

ANONYMOUS DIGITAL FILE SHARING

FIELD

The subject matter disclosed herein relates to file sharing and more particularly relates to anonymous digital file sharing.

BACKGROUND

Conventional applications and/or systems require users to know one another before they can share digital files even though users may be included in a digital photo, video, and/or audio file of a user that they do not know.

BRIEF SUMMARY

Apparatus, methods, and computer program products that can anonymously share digital files are disclosed. Various embodiments of an apparatus include a processor of an information handling device and memory that stores code executable by the processor. The code can cause the processor to match a first client to one or more digital files provided by a second client based on a content signature in each of the one or more digital files and notify the first client of a match. The first client can be anonymous to the second client and/or the second client maybe anonymous to the first client. A method and program product can also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
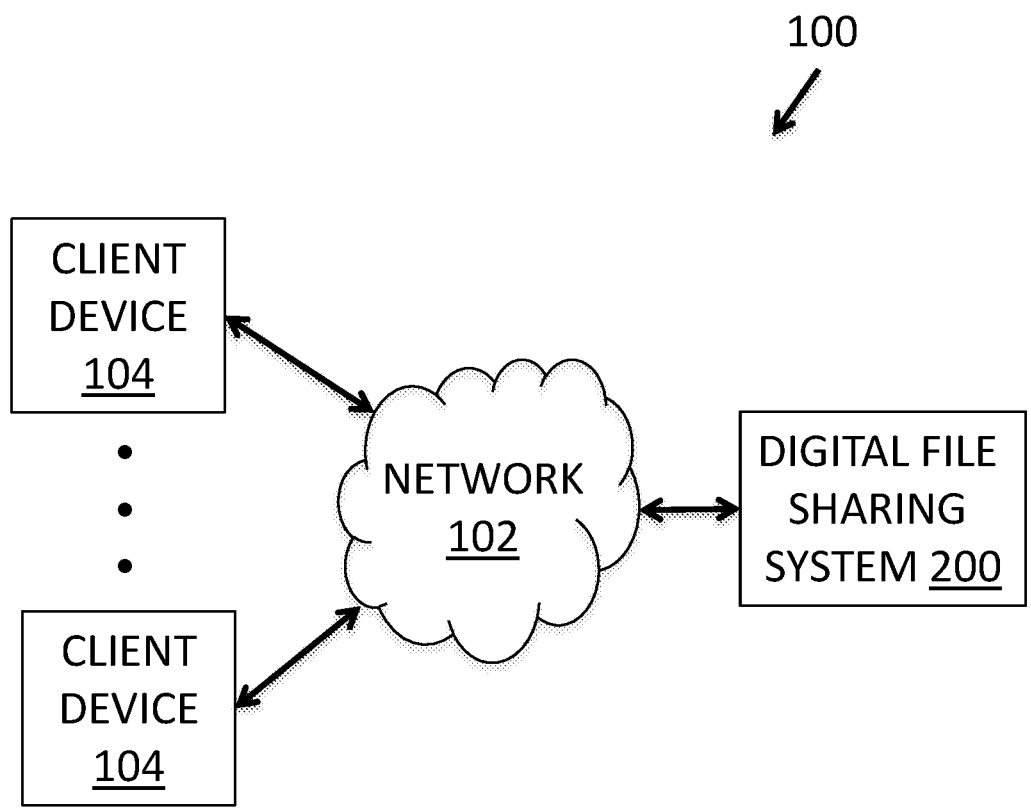
FIG. 1 is a schematic block diagram illustrating one embodiment of a network that can anonymously share digital files.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," "the," and "set" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a network 100 that can perform and/or facilitate anonymous digital file sharing. At least in the illustrated embodiment, the network 100 includes, among other components, a computing network 102 that couples one or more client devices 104 to a system 200 that can be referred to herein as a digital file sharing system and/or a social media system, which can also be referred to as an apparatus and/or a device.

A computing network 102 may be any wired and/or wireless computing network 102 (e.g., public and/or private computer networks in any number and/or configuration (e.g., the Internet, an intranet, a cloud network, etc.)) that is known or developed in the future that can couple and/or facilitate the coupling of and/or communication between one or more client devices 104 and the system 200. In various embodiments, the communication network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or information handling devices connected together for the purpose of sharing resources.

A client device 104 may include any hardware and/or software (e.g., a thick client, a thin client, or hybrid thereof) that is known or developed in the future that can access the system 200 via the computing network 102, directly, and/or independently. A client device 104, as part of its respective operation, may rely on sending input/output (I/O) requests to the system 200 to write data, read data, and/or modify data, etc. For instance, a client device 104 can transmit I/O requests to write, read, store, communicate, propagate, and/or transport digital files, instructions, data, computer programs, software, code, routines, etc., to the system 200.

In various embodiments, a client device 104 may be a cellular telephone, a smart device, a computing tablet, a laptop computer, a desktop computer, and/or or other information handing device/system and may further form at least a portion of a computing node in a computing network. While FIG. 1 depicts the network 100 as including three client devices 104, other embodiments may include one client device 104, two client devices 104, or more than three client devices 104 such that the various embodiments of the network 100 are not limited to three client devices 104.

The client device(s) 104 can access the system 200 and/or initiate communication with the system 200 through a network socket utilizing one or more inter-process networking techniques. In various embodiments, the client device(s) 104 and the system 200 may comprise at least a portion of a client-server model.

Figure 2:
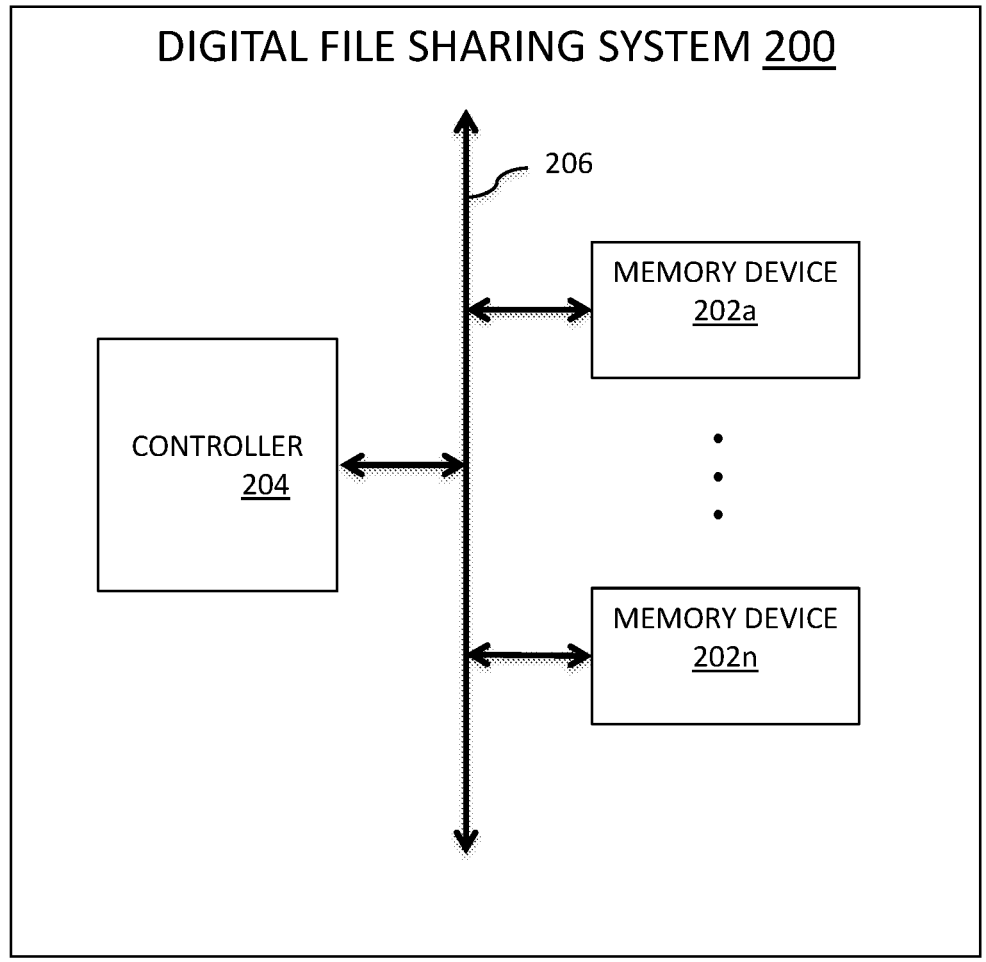
FIG. 2 is a schematic block diagram illustrating one embodiment of a system that can anonymously share digital files included in the network of FIG. 1.

Referring to FIG. 2, FIG. 2 is a block diagram of one embodiment of a system 200 that can perform and/or facilitate anonymous digital file sharing. At least in the illustrated embodiment, the system 200 includes, among other components, a set of memory devices 202a through 202n (also simply referred to individually, in various groups, or collectively, as memory device(s) 202) coupled to and/or in communication with a controller 204 via a bus 206 (e.g., a wired and/or wireless bus).

The memory device(s) 202 may be any type of memory that is known or developed in the future that can store computer-usable and/or computer-readable data. In various embodiments, a memory device 202 may include one or more non-transitory computer-usable mediums (e.g., readable, writable, modifiable, etc.), which may include any non-transitory and/or persistent apparatus or device that can contain, store, communicate, propagate, and/or transport digital files, instructions, data, computer programs, software, code, routines, etc., for processing by or in connection with a computer processing device, an information handling device, and/or the system 200.

In various embodiments, a memory device 202 can be implemented as a flash memory device (e.g., a solid-state devices (SSD) or other type of non-volatile memory/storage device that can store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory, etc. that are possible and contemplated herein. Further, a memory device 202, in various embodiments, may include non-volatile/persistent hardware and/or software configured to perform long-term data storage operations, including, but not limited to, data archiving, data backup, data mirroring, replicating data, etc. For instance, a memory device 202 may include non-volatile and/or persistent hardware and/or software configured to perform long-term data storage operations, which may include write operations, read operations, read-write operations, etc., among other I/O operations.

Figure 3:
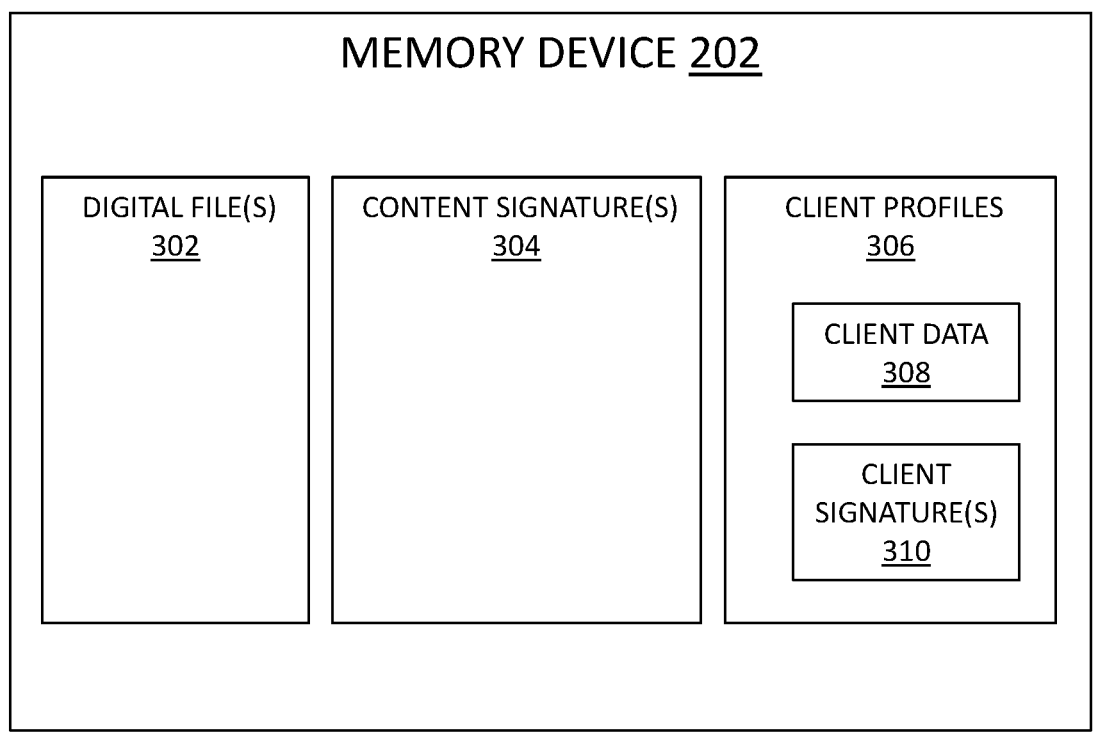
FIG. 3 is a schematic block diagram illustrating one embodiment of a memory device included in the system of FIG. 2.

As illustrated in the embodiment of FIG. 3, a memory device 202 can generate and/or store a library of digital files 302, a library of content signatures 304, and/or a library of client profiles 306. Some non-limiting examples of a digital file 302 include, but are not limited to, a set of photos, a set of videos, a set of audio tracks, a set of emails, a set of data files, and/or a set of written communication files (e.g., one or more articles, stories, letters, transcripts, and/or other type of communication that uses alpha-numeric characters, etc.), among other possible types of communication/social media files that can be recorded, each of which are contemplated herein. Further, the digital file(s) 302 may comprise and/or form a portion of a social media file.

In additional or alternative embodiments, the digital files 302 can be shared and/or exchanged among the client devices 104. For instance, a memory device 202 may receive a request to read a digital file 302 and, in response thereto, perform a read operation that transmits the requested digital file 302 to the client device 104. Further, a memory device 202 may receive a request to write a digital file 302 therein and, in response thereto, perform a write operation that writes/stores the digital file 302 to one or more memory elements in the memory device(s) 202.

A content signature 304 can be any type of data and/or computer-readable code that is known or developed in the future that can represent the content and/or one or more objects in a digital file 302. In some embodiments, a content signature 304 can represent biometric data for one or more animate objects (e.g., a human, an animal (pet), a bird, an insect, a plant, etc.). In additional or alternative embodiments, a content signature 304 can include a representation of one or more inanimate objects (e.g., a vehicle, a chattel, a landmark, a geographic location, an event, etc.). In further additional or alternative embodiments, a content signature 304 may include a representation of an inanimate object that can be associated with an animate object.

A content signature 304, in some additional or alternative embodiments, can include metadata associated with an object in a digital file 302. For example, the metadata can include a time stamp, a geo-location tag, and/or the like information/data that can allow identification of a time, place, event, and/or object.

In further embodiments, the metadata can include a type of content, a quality of content, and/or quantity of content. For example, the metadata can indicate that a photo/video includes a crowd scene and/or the proximity of each client to the position from which the digital file 302 was generated, which can include an indication of quantity (near, far, etc.) and/or quality (e.g., clear, blurry, etc.). In a further non-limiting example, the metadata can include the pixel size and/or decibel level, etc. of one or more clients included therein and/or provide a quality/quantity rating for the client(s) based on the proximity, pixel size, and/or decibel level, etc.

A content signature 304 can be used to identify an anonymous client or a client that is unknown to the client that owns/generated a digital file 302 in which the anonymous/unknown client is included therein. For instance, a content signature 304 can be utilized to match an object in a digital file to an anonymous/unknown client via a client profile 306.

In various embodiments, a client profile 306 can include, among other components, client data 308 and one or more client signatures 310, which can be submitted and/or modified by the client. The client data 308 can include demographic information (e.g., age, gender, nationality, income level, etc.), contact information (e.g., phone number, email address, mailing address, etc.), and/or payment information (e.g., credit/debit card information, back account information, etc.), among other suitable client data 308 that is possible and contemplated herein.

A client signature 310 can include any data and/or computer-readable code that can allow identification of a client in a digital file 302. In some embodiments, a client signature 310 can include biometric data corresponding to a client and/or human. Some examples of suitable biometric data for a client/human can include, but are not limited to, a facial feature, a hair style/color feature, a tattoo feature, a dental feature (e.g., shape, size, color, quantity, pattern, prosthetics, grill, braces, etc.), an eye feature (e.g., shape, size, color, quantity, etc.), an injury/scar feature, a total body shape/size signature, a partial body shape/size signature, a vocal feature (e.g., frequency, pitch, cadence, and/or tone, etc.), a gait feature, a gesture feature, a talent feature, and/or the like biometric data that can be unique to a particular user and allows identification of the particular user in a digital file 302.

In additional or alternative embodiments, a client signature 310 can include biometric data corresponding to an animal/pet associated with a client and/or corresponding to the animal/pet itself. Some examples of suitable biometric data for an animal pet can include, but are not limited to, a species, a facial feature, a dental feature (e.g., shape, size, color, quantity, pattern, etc.), an eye feature (e.g., shape, size, color, quantity, etc.), a total body size/shape signature, a partial body size/shape signature, a missing limb feature, an injury/scar feature, a deformity feature, a fur color/pattern feature, a branding feature, a vocal feature, a gait feature, a gesture feature, a talent feature, and/or the like biometric data that can be unique to a particular animal/pet and allows identification of the particular animal/pet in a digital file 302.

A client signature 310, in further additional or alternative embodiments, can include data corresponding to one or more inanimate objects associated with a client. In some embodiments, data corresponding to an inanimate object associated with a client can include one or more mobile inanimate objects. Some examples of suitable data corresponding to an inanimate object can include, but are not limited to, a terrestrial vehicle, a marine vessel, an aircraft, one or more articles of clothing, headwear, footwear, a cellular telephone, a mobile computing device (e.g., a laptop computer, a computing tablet, a MP3 player, etc.), a purse, a wallet, luggage, a backpack, a watch, jewelry, and/or the like inanimate object(s) and/or chattels that can be associated with a client, especially the object(s) that may be uniquely associated with the client.

In still further additional or alternative embodiments, a client signature 310 can include data corresponding to one or more events associated with a client. Some examples of suitable data corresponding to an event can include, but are not limited to, one or more time stamps, a geographic location, a landscape scene, a landmark, a concert, a sporting event, a festival, a holiday, a vacation, an employment event, a school event, a familial event, a religious event, an interpersonal event (e.g., an engagement, a wedding, a divorce, a separation, a breakup, a birth, a death, a funeral, etc.), and/or the like events that can be associated with a client, especially the event(s) that may be uniquely associated with the client.

Figure 4:
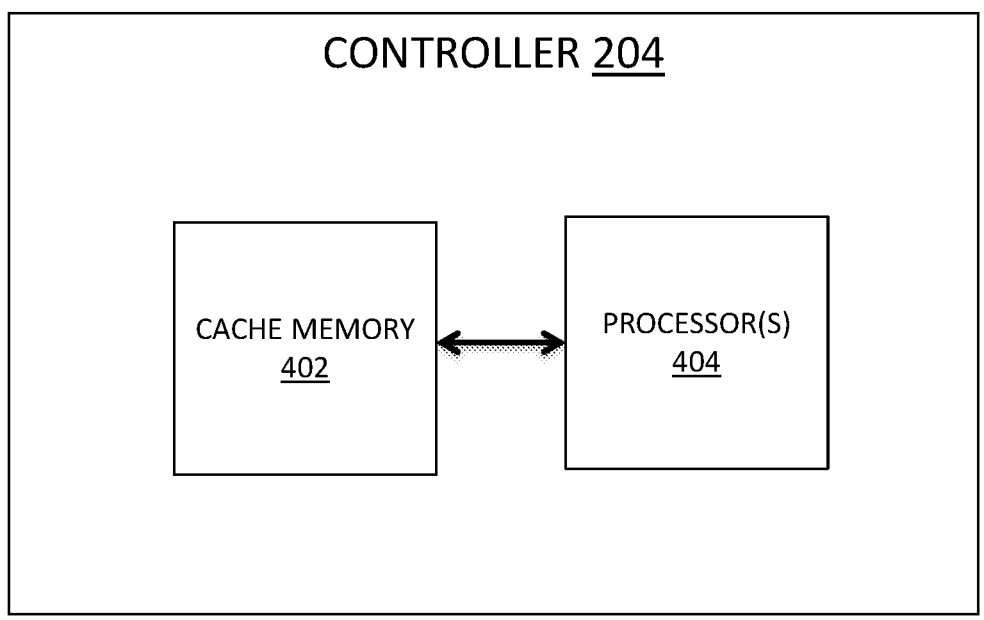
FIG. 4 is a schematic block diagram illustrating one embodiment of a controller included in the system of FIG. 2.

With reference to FIG. 4, FIG. 4 is a block diagram of one embodiment of a controller 204. A storage controller 204 may include, among other components, a cache memory 402 and a set of processors 404 coupled to and/or in communication with one another.

A cache memory 402 may be any type of memory (e.g., hardware and/or software) that is known or developed in the future that can store/buffer digital files 302. In some embodiments, a cache memory 402 may at least temporarily store/buffer digital files 302 in response to I/O requests (e.g., write request, read request, and/or read-write request, etc.) received from the client device(s) 104.

A set of processors 404 can include hardware and/or software that can execute instructions in one or more applications and/or modules that cause the processor(s) 404 to perform operations for anonymous digital file sharing. In various embodiments, a processor 404 can receive client data 308 from the client device(s) 104.

In response receiving the client data 308, the processor(s) 404 can generate and/or modify a client profile 306, which are discussed elsewhere herein. The client profiles 306 may be organized, grouped, and/or combined to generate a library of client profiles 306. Further, a processor 404 can perform operations to store/write the client profiles 306, library of client profiles 306, and/or modifications to a client profile 306 to the memory device(s) 202.

In some embodiments, the processor(s) 404 can generate and/or modify a client signature 310 based on a client profile 306 and/or client data 308. The client signatures 310 may be organized, grouped, and/or combined to generate a library of client signatures 310. Further, a processor 404 can perform further operations to store/write the client signatures 310, library of client signatures 310, and/or modifications to a client signature 310 to the memory device(s) 202.

In additional or alternative embodiments, a processor 404 can receive one or more client signature 310 from a client via the client device(s) 104. The processor 404 can associate the client signature(s) 310 to the client and/or the client device(s) 104 that submitted/transmitted the client signature(s) 310.

A processor 404, in various embodiments, can receive digital files 302 from clients via the client device(s) 104, which are discussed elsewhere herein. The processor 404 can associate a digital file 302 to the client(s) and/or client device(s) 104 that submitted/transmitted the digital file 302 (e.g., a source client). This association can allow another client (e.g., a target client) to identify and/or contact the source client that submitted, transmitted, owns, and/or generated the digital file 302.

A processor 404, in additional or alternative embodiments, can receive from clients the metadata corresponding to digital files 302 stored locally in the client device(s) 104. The processor 404 can associate the metadata to the source client(s) and/or source client device(s) 104. This association can allow a target client to identify and/or contact the source client that submitted, transmitted, owns, and/or generated the digital file 302.

In some embodiments, a processor 404 can perform operations to store/buffer digital files 302 and/or metadata in the cache memory 402. The processor 404 can further organize, group, and/or combine the digital files 302 to generate a library of digital files 302, which can include the metadata. In some embodiments, a processor 404 can perform further operations to store the digital files 302, metadata, and/or the library of digital files 302 to the memory device(s) 202.

In further embodiments, a processor 404 can parse each digital file 302 to generate a content signature 304 that corresponds to and/or represents one or more objects included in a digital file 302, as discussed elsewhere herein. A processor 404 can further organize, group, and/or combine the content signatures 304 to generate a library of content signatures 304. In some embodiments, a processor 404 can perform further operations to store the content signatures 304 and/or the library of content signatures 304 to the memory device(s) 202.

A processor 404, in various embodiments, can match and/or identify one or more objects that is/are associated with a target client that is included in one or more digital files 302 stored in the memory device(s) 202. The one or more digital files 302 can be received from a source client that is anonymous and/or unknown to the target client, the target client is anonymous/unknown to the source client, or both. Here, a target client can be matched to one or more digital files 302 that include the target client and that was/were submitted, transmitted, owned, and/or generated by a source client that the target client does not know and/or is anonymous to the target client, vice versa, or both.

The matched/identified object(s) may include the target client and/or one or more objects associated with the target client. The associated object(s) may be animate and/or inanimate objects, which are discussed elsewhere herein, that correspond to the target client.

To match and/or identify the one or more objects, a processor 404 can compare the content signature(s) 304 associated with the object(s) in a digital file 302 and the client signature(s) 310 associated with a target client. A match and/or identity can be determined in response to a content signature 304 and a client signature 310 including/representing the same data and/or greater than a predetermined amount of the same data (e.g., greater than about seventy-five percent (75%) of the same data, among other percentages that are possible and contemplated herein) and/or within a threshold differential (e.g., less than about twenty-five percent (25%), among other percentages that are possible and contemplated herein).

For instance, a match/identity may be determined in response to one or more facial features in a content signature 304 matching the facial feature(s) in a client signature 310 by greater than a threshold amount and/or within a threshold differential. In another non-limiting example, a match/identity may be determined in response to clothing and a timestamp in a content signature 304 matching the clothing by greater than a threshold amount and/or within a threshold differential and/or the timestamp in a client signature 310.

A processor 404 can further include hardware and/or software to communicate with the client device(s) 104. In some embodiments, a processor 404 can transmit one or more notifications to the client device(s) 104. A notification can indicate that one or more digital files 302 include therein the client and/or one or more objects (e.g., inanimate and/or animate objects) associated with the client.

In some embodiments, a processor 404 can receive requests to search the digital files 302 for data that includes a client and/or can be associated with a client. For instance, in response to receiving a request from a client (e.g., via a client device 104), a processor 404 can search the content signature(s) 304 of photos, videos, and/or audio tracks, etc. to determine if the client signature(s) 310 corresponding to this client matches one or more of the content signature(s) 304. The processor 404, in response to one or more matches, can transmit one or more notifications indicating the match/matches.

In additional or alternative embodiments, a processor 404 can proactively search the digital files 302 for data that includes a client and/or can be associated with a client. For instance, a processor 404 can, on its own initiative, search the content signature(s) 304 of the digital files 302 to determine if the client signature(s) 310 corresponding to any client matches one or more content signature(s) 304 of a photo, video, and/or audio track, etc. In response to each match, the processor 404 can transmit one or more notifications indicating the match/matches to each client (e.g., via the client device(s) 104) that is matched.

In further additional or alternative embodiments, a processor 404 can proactively search and/or be prompted to search the digital files 302 for data that includes a client and/or can be associated with a client. For instance, a processor 404 can, on its own initiative and/or in response to a client request, search the content signature(s) 304 of the digital files 302 to determine if the client signature(s) 310 corresponding to any client matches one or more content signature(s) 304 of an event. In response to each match, the processor 404 can, on its own behalf and/or on behalf of a source client, advertise the match/matches to each client that is matched (e.g., each target client that attended the event). In a further or alternative embodiment, the processor 404 may advertise the digital files including an event, location, or other general/public interest to all of the clients and/or target one or more clients that may be interested in the event, location, or other general/public interest, which can be determined via a client profile 306, client data 308, and/or client signature 310.

A processor 404, in some embodiments, can filter a search for a client and/or object(s) associated with a client in the digital files 302, which filtering can be initiated by the processor 404 and/or performed in response to a client request. For instance, a client may request a list of digital files 302 in which the client and/or an object associated with a client is greater than a threshold pixel size/amount, louder than a threshold volume, and/or is clearer than a predetermined value, etc. In some embodiments, a processor 404 may utilize a Laplace filter to filter the digital files 302. In additional or alternative embodiments, a crowd sourcing technique may be used to filter a client and/or other human/client from a group of persons, which can include a Laplace filter among other techniques that are possible and contemplated herein. The processor 404 may further transmit the filtered results/digital files 302 to the client.

In various embodiments, a processor 404 can maintain and/or protect the identity of a source client and/or a target client. For instance, a hash function of a content signature 306 (e.g., one or more biometric features of the source client, etc.) and/or client signature 310 (e.g., the biometric feature(s) of one or more target clients, etc.) may be used to identify, match, and/or otherwise associate/correlate a digital file 302 to a source client and/or target client. In a further non-limiting example, the hash function of a content signature 306 (e.g., one or more biometric features, etc.) may be used for digital files 302 that are advertised generally or provided to more than a predetermined quantity of clients (e.g., two or more clients).

A processor 404, in some embodiments, can receive one or more restrictions from a source client and/or target client. A restriction may limit access to a digital file 302 to a selected and/or predetermined group or subset of clients. For example, the selected group may be based on a demographic of the clients (e.g., age, gender, etc.), a geographic location of the clients, an interpersonal relationship (e.g., friend, family, colleague, etc.), and/or the like attribute(s)/metric(s).

In various embodiments, the processor(s) 404 can facilitate an exchange of digital files 302 between clients. In some embodiments, digital files 302 may be traded and/or gratuitously exchanged between clients. In additional or alternative embodiments, the processor(s) 404 can facilitate the sale and/or purchase of digital files 302.

Figure 5:
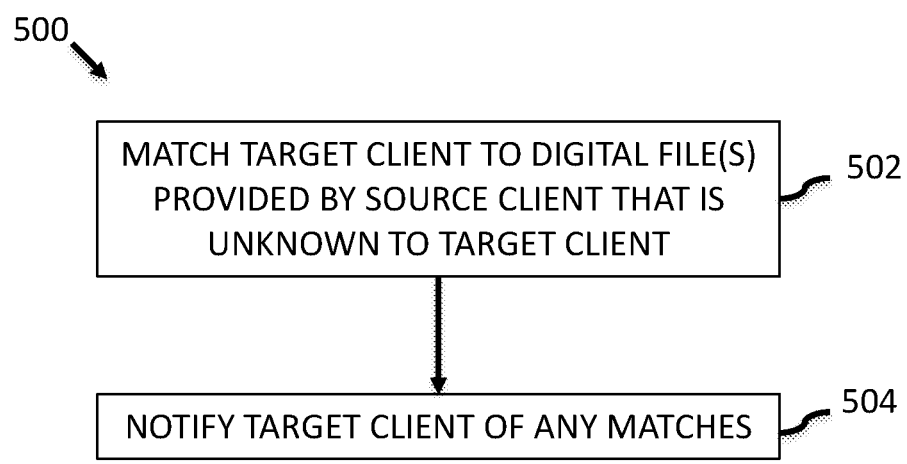
FIG. 5 is a schematic flow chart diagram illustrating one embodiment of a method that can anonymously share digital files.

FIG. 5 is a schematic flow chart diagram illustrating one embodiment of a method 500 that can anonymously share digital files. The method 500, in some embodiments, may be performed by a set of processors 404.

At least in the illustrated embodiment, the method 500 can begin by the processor(s) 404 matching a first or target client to one or more digital files 302 provided by a second or source client (block 502). The match may be based on a content signature 304 in the digital file(s) 302. For instance, a match can be determined in response to one or more client profiles 306, client data 308, and/or client signatures 310 matching one or more content signatures 304 in the digital file(s) 302 and/or matching within a threshold amount/ percentage/metric (e.g., greater than or equal to 75%, among other possibilities that are contemplated herein).

In some embodiments, the first/target client is unknown and/or anonymous to the second/source client, vice-versa, or both. The method 500 can further include notifying the first/target client of a match (block 504).

Figure 6:
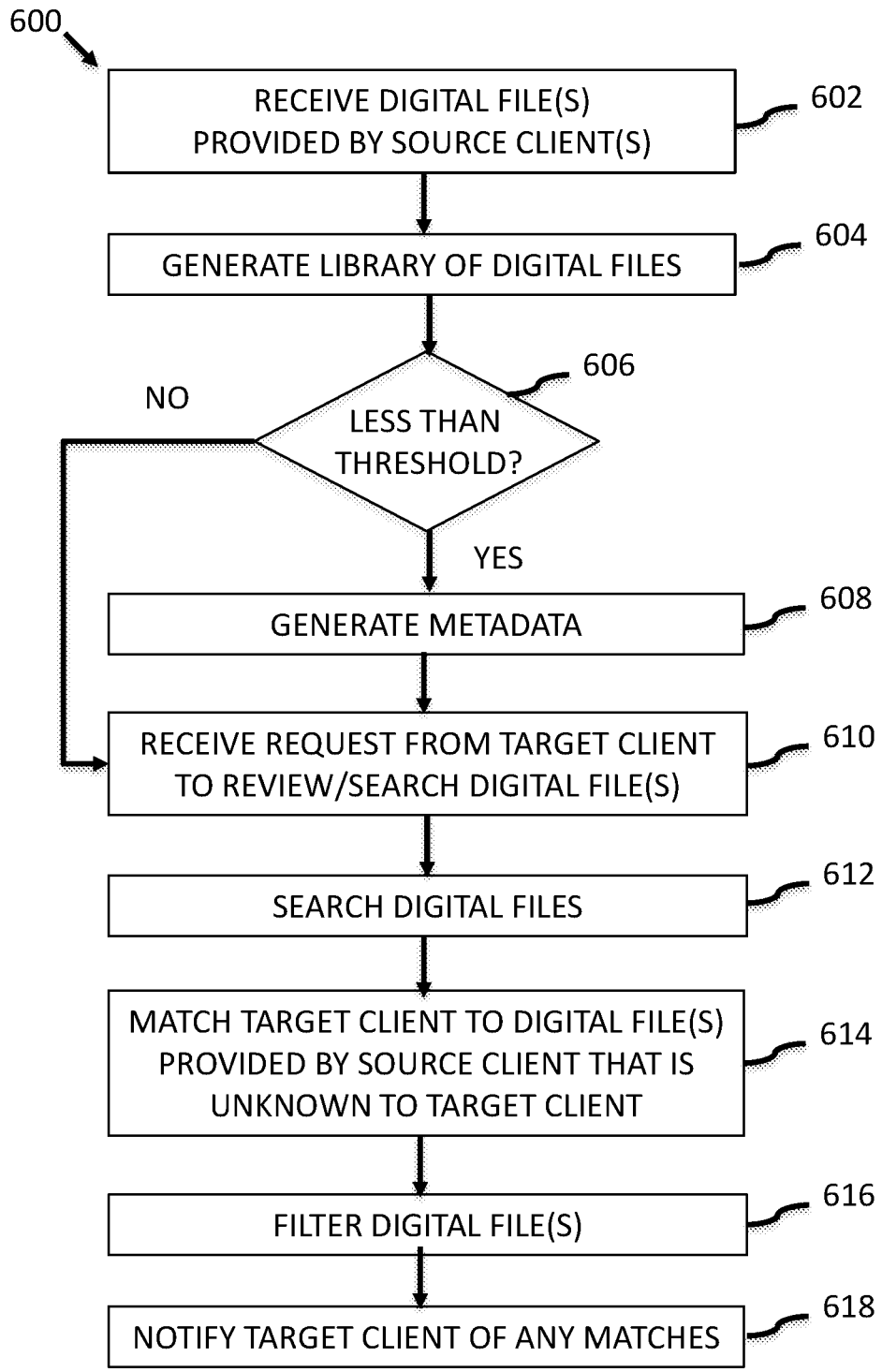
FIG. 6 is a schematic flow chart diagram illustrating another embodiment of a method that can anonymously share digital files.

FIG. 6 is a schematic flow chart diagram illustrating another embodiment of a method 600 that can anonymously share digital files. The method 600 may be performed by a set of processors 404.

At least in the illustrated embodiment, the method 600 can begin by receiving digital files 302 from a set of second/ source clients (block 602). The digital files 302 may be grouped, organized, and/or combined to generate/create a library of digital files 302 (block 604).

In various embodiments, the processor(s) 404 can determine that one or more content signatures 304 in one or more digital files 302 includes a metric (e.g., an inclusiveness metric) that is less than a predetermined amount or threshold (block 606). In response to the inclusiveness metric being greater than the threshold (e.g., a NO in block 606), the processor(s) 404 proceed to block 610).

In response to the inclusiveness metric being less than or equal to the threshold (e.g., a YES in block 606), the processor(s) 404 can generate metadata indicating the type of content, a quality of content, and/or quantity of content (block 608). For example, the metadata can indicate that a photo/video includes a crowd scene and/or the proximity of each client to the position from which the digital file 302 was generated, which can include an indication of quantity (near, far, etc.) and/or quality (e.g., clear, blurry, etc.). In a further non-limiting example, the metadata can include the pixel size and/or decibel level, etc. of one or more clients included therein and/or provide a quality/quantity rating for the client(s) based on the proximity, pixel size, and/or decibel level, etc.

The processor(s) 404 can receive a request from a first or target client to review the digital files 302 that may include the first/target client and/or object(s) related to the first/target client (block 610). In response to the request, the processor(s) 404 can search the digital files 302 to determine if one or digital files 302 includes the target client and/or one or more objects associated with the target client (block 612).

The processor(s) 404 can match the target client to one or more digital files 302 in the library based on matching the content signature(s) of the digital file(s) 302 and the client profile 306, client data 308, and/or client signature 310 for the target client (block 614). In some embodiments, the first/target client is unknown and/or anonymous to the second/source client(s), vice-versa, or both. For instance, a match can be determined in response to one or more client profiles 306, client data 308, and/or client signatures 310 matching one or more content signatures 304 in the digital file(s) 302 and/or matching within a threshold amount/ percentage/metric (e.g., greater than or equal to 75%, among other possibilities that are contemplated herein).

In additional or alternative embodiments, the processor(s) 404 can filter the digital files 302 based on content, quality, and/or quantity (block 616). The method 600 can further include notifying the first/target client of any matches (block 618).

Figure 7:
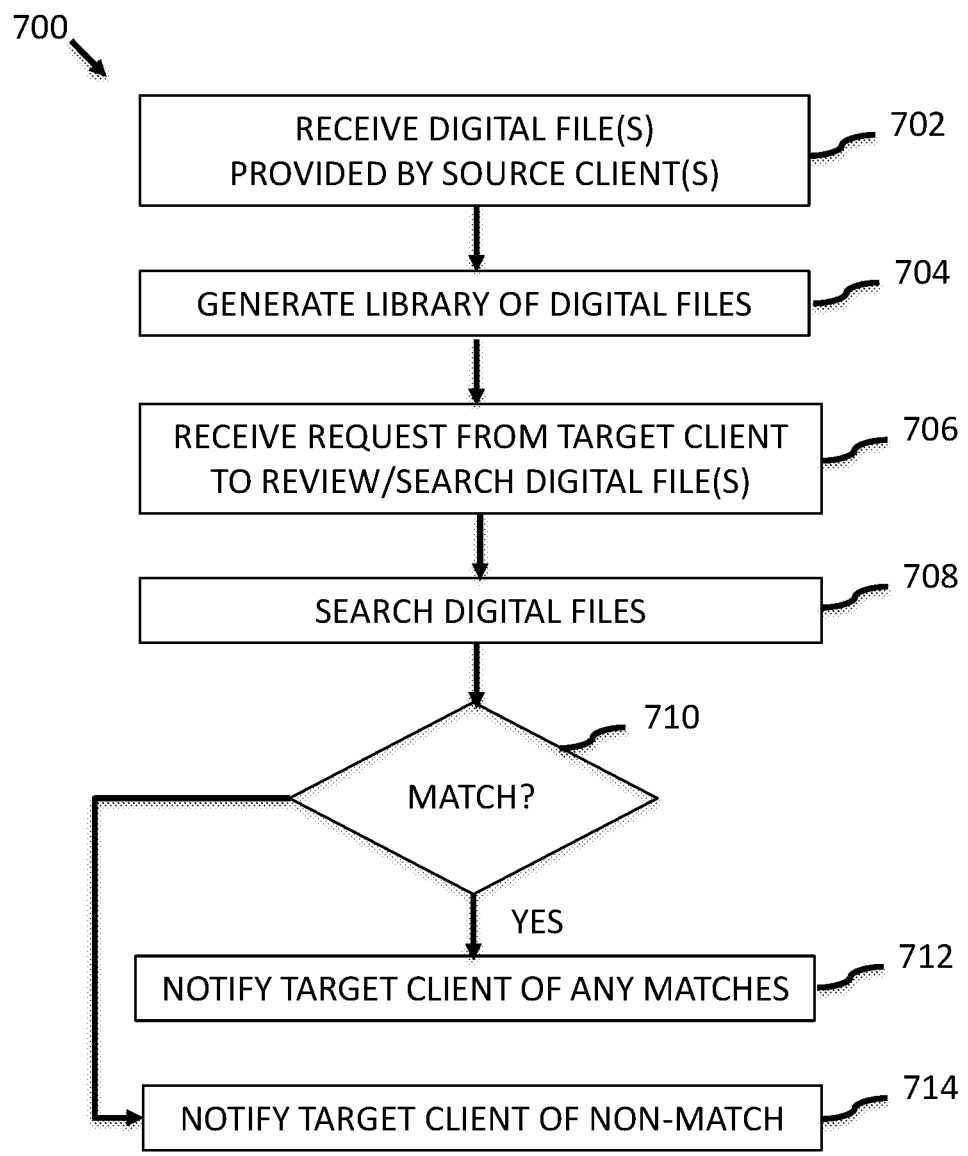
FIG. 7 is a schematic flow chart diagram illustrating one embodiment of a method that can locate objects utilizing anonymously shared digital files.

With reference to FIG. 7, FIG. 7 is a schematic flow chart diagram illustrating one embodiment of a method 700 that can locate one or more clients and/or objects utilizing anonymous digital file sharing. The method 700 may be performed by a set of processors 404.

At least in the illustrated embodiment, the method 700 can begin by receiving digital files 302 from a set of second/ source clients (block 702). The digital files 302 may be grouped, organized, and/or combined to generate/create a library of digital files 302 (block 704).

The processor(s) 404 can receive a request from a first or target client to review the digital files 302 including a content signature 304 for one or more objects (block 706). The request may be based on the target client attempting to locate an animate object and/or inanimate object. For example, the target client may desire the timestamp of an event and/or location in which a chattel (e.g., cellular telephone, wallet, purse, etc.) is present in a digital file 302 so that the target client may be able to better locate the object(s).

In response to the request, the processor(s) 404 can search the digital files 302 to determine if one or digital files 302 includes the target client and/or one or more objects associated with the target client (block 708). In some embodiments, the first/target client is unknown and/or anonymous to the second/source client(s), vice-versa, or both.

The processor(s) 404 can determine a match based on matching the content signature(s) of the digital file(s) 302 and the client profile 306, client data 308, and/or client signature 310 for the target client (block 710). In response to a match (e.g., a YES in block 710), the processor(s) 404 can notify the first/target client of any matches (block 712). In response to a non-match (e.g., a NO in block 710), the processor(s) 404 can notify the first/target client of the non-match (block 714).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor of an information handling device; and
a memory that stores code executable by the processor to:
create a client profile for each of a plurality of clients to generate a plurality of client profiles,
receive one or more digital files from each of the plurality of clients,
associate the one or more digital files received from each client with the client profile corresponding to each respective client,
generate a library of client profiles comprising the plurality of client profiles with their respective one or more digital files, wherein:
each digital file from each client in the plurality of clients includes a respective content signature,
at least a first client and a second client in the plurality of clients are unknown to each other in real-life,
the first client is unaware of the one or more digital files in the user profile of the second client that is unknown to the first client in real-life, and
the second client is unaware of the one or more digital files in the user profile of the first client that is unknown to the second client in real-life,
compare a client signature for the first client in the plurality of clients to the content signature in each of the one or more digital files in the user profile for the second client in the plurality of clients that is unknown to the first client in real-life to determine if the client signature for the first client matches the content signature in any of the one or more digital files in the user profile for the second client that is unknown to the first client in real-life, and
notify the first client of each match,
wherein the client signature includes one of a digital representation of a physical characteristic of the first client and a digital representation of a physical characteristic of an object associated with the first client.

2. The apparatus of claim 1, wherein the code is further executable by the processor to:
receive, from the first client, a request to review digital files corresponding to the first client; and
search the library of digital files for matches in response to the request.

3. The apparatus of claim 1, wherein:
the client profiles correspond to client signatures associated with the plurality of clients; and
the code is further executable by the processor to:
search the client profiles in response to receipt of each digital file, and
determine a match based on a threshold matching metric for the content signature and a client signature associated with the second client.

4. The apparatus of claim 1, wherein the code is further executable by the processor to:
determine that the content signature in the one or more digital files includes a metric with less than a threshold quality; and
write metadata to each digital file in the one or more digital files including less than the threshold quality.

5. The apparatus of claim 4, wherein the code is further executable by the processor to:
filter the one or more digital files based on the metadata in response to receipt of a filter request from the first client; and
transmit the filtered one or more digital files to the first client,
wherein the computer-readable code to determine that the metric is less than the threshold quality further comprises computer-readable code executable by the processor to determine the metric with respect to the first client and comprises an inclusiveness metric.

6. The apparatus of claim 1, wherein the code is further executable by the processor to generate the content signature for the one or more digital files based on data corresponding to an animate object.

7. The apparatus of claim 1, wherein the code is further executable by the processor to generate the content signature for the one or more digital files based on biometric data corresponding to the first client.

8. The apparatus of claim 1, wherein the code is further executable by the processor to generate the content signature for the one or more digital files based on biometric data corresponding to an animal.

9. The apparatus of claim 1, wherein the code is further executable by the processor to generate one of a geo-location tag and a timestamp in the content signature for the one or more digital files.

10. The apparatus of claim 1, wherein the code is further executable by the processor to:
generate the content signature for the one or more digital files based on one or more characteristics corresponding to an inanimate object; and
generate one of a geo-location tag and a timestamp in the content signature.

11. The apparatus of claim 1, wherein the code is further executable by the processor to store one or more of a set of photo files, a set of video files, and a set of audio files.

12. The apparatus of claim 1, wherein the respective content signature in each of the digital files in the library of client profiles is based on respective contents in each digital file.

13. A method, comprising:
creating a client profile for each of a plurality of clients to generate a plurality of client profiles;
receiving one or more digital files from each of the plurality of clients;
associating the one or more digital files received from each client with the client profile corresponding to each respective client;
generating a library of client profiles comprising the plurality of client profiles with their respective one or more digital files, wherein:
each digital file from each client in the plurality of clients includes a respective content signature,
at least a first client and a second client in the plurality of clients are unknown to each other in real-life,
the first client is unaware of the one or more digital files in the user profile of the second client that is unknown to the first client in real-life, and
the second client is unaware of the one or more digital files in the user profile of the first client that is unknown to the second client in real-life;
comparing, by use of a processor, a client signature for the first client in the plurality of clients to the content signature in each of the one or more digital files in the user profile for the second client in the plurality of clients that is unknown to the first client in real-life to determine if the client signature for the first client matches the content signature in any of the one or more digital files in the user profile for the second client that is unknown to the first client in real-life; and notifying the first client of each match,
wherein the client signature includes one of a digital representation of a physical characteristic of the first client and a digital representation of a physical characteristic of an object associated with the first client.

14. The method of claim 13, further comprising:
receiving, from the first client, a request to review digital files corresponding to the first client; and
searching each of the digital files in the library of client profiles for matches in response to the request.

15. The method of claim 13, further comprising:
searching the client profiles in response to receipt of each digital file; and
determining a match based on a threshold matching metric for the content signature and a client signature associated with the second client.

16. The method of claim 13, further comprising:
determining that the content signature in the one or more digital files comprises an inclusiveness metric with less than a threshold quality with respect to the first client;
writing metadata to each digital file in the one or more digital files including less than the threshold quality; and
filtering the one or more digital files based on the metadata in response to receipt of a filter request from the first client.

17. A program product comprising a non-transitory computer-readable storage medium that stores code executable by a processor, the executable code comprising code to perform:
creating a client profile for each of a plurality of clients to generate a plurality of client profiles;
receiving one or more digital files from each of the plurality of clients;
associating the one or more digital files received from each client with the client profile corresponding to each respective client;
generating a library of client profiles comprising the plurality of client profiles with their respective one or more digital files, wherein:
each digital file from each client in the plurality of clients includes a respective content signature,
at least a first client and a second client in the plurality of clients are unknown to each other in real-life,
the first client is unaware of the one or more digital files in the user profile of the second client that is unknown to the first client in real-life, and
the second client is unaware of the one or more digital files in the user profile of the first client that is unknown to the second client in real-life;
comparing a client signature for the first client in the plurality of clients to the content signature in each of the one or more digital files in the user profile for the second client in the plurality of clients that is unknown to the first client in real-life to determine if the client signature for the first client matches the content signature in any of the one or more digital files in the user profile for the second client that is unknown to the first client in real-life; and
notifying the first client of each match,
wherein the client signature includes one of a digital representation of a physical characteristic of the first client and a digital representation of a physical characteristic of an object associated with the first client.

18. The program product of claim 17, wherein the executable code further comprises code to perform:
receiving, from the first client, a request to review digital files corresponding to the first client; and
searching each of the digital files in the library of client profiles for matches in response to the request.

19. The program product of claim 17, wherein the executable code further comprises code to perform:
searching the client profiles in response to receipt of each digital file; and
determining a match based on a threshold matching metric for the content signature and a client signature associated with the second client.

20. The program product of claim 17, wherein the executable code further comprises code to perform:
determining that the content signature in the one or more digital files comprises an inclusiveness metric with less than a threshold quality with respect to the first client;
writing metadata to each digital file in the one or more digital files including less than the threshold quality; and
filtering the one or more digital files based on the metadata in response to receipt of a filter request from the first client.

* * * * *